US006968783B2

(12) United States Patent
Hug et al.

(10) Patent No.: US 6,968,783 B2
(45) Date of Patent: Nov. 29, 2005

(54) METHOD FOR PRINTING SECURITY DOCUMENTS USING SHEETS WITH IDENTIFIERS

(75) Inventors: Beat Walter Hug, Zürich (CH); Bernhard Imbach, Kloten (CH)

(73) Assignee: Orell Fussli Sicherheitsdrucl AG, Zurich (CH)

( * ) Notice: Subject to any disclaimer, the term of this patent is extended or adjusted under 35 U.S.C. 154(b) by 0 days.

(21) Appl. No.: 10/473,756

(22) PCT Filed: Apr. 11, 2001

(86) PCT No.: PCT/IB01/00597

§ 371 (c)(1), (2), (4) Date: Feb. 3, 2004

(87) PCT Pub. No.: WO02/083423

PCT Pub. Date: Oct. 24, 2002

(65) Prior Publication Data

US 2004/0112235 A1 Jun. 17, 2004

(51) Int. Cl.[7] ........................... B41F 1/54; B41M 1/10; G06K 15/00

(52) U.S. Cl. ...................... 101/484; 101/170; 358/1.15

(58) Field of Search ............................... 101/484, 170, 101/71, 233, 238, 76, 12; 358/1.15, 1.14, 358/1.18; 700/124; 705/34–47; 382/100; 283/111, 72; 707/1

(56) References Cited

U.S. PATENT DOCUMENTS 4,045,944 A * 9/1977 Giori ........................... 53/520
4,442,541 A * 4/1984 Finkel et al. ............... 382/135
4,448,121 A * 5/1984 Uno et al. .................... 101/76
4,453,707 A * 6/1984 Kuhfuss ...................... 270/60
4,463,677 A * 8/1984 Kuehfuss .................... 101/483
4,536,016 A * 8/1985 Solomon et al. ............ 283/111
4,633,395 A * 12/1986 Kuehfuss ..................... 705/28
4,677,551 A * 6/1987 Suganuma ...................... 710/1
4,947,321 A * 8/1990 Spence et al. ................ 705/45
5,085,417 A * 2/1992 Copham .................... 270/1.02
5,291,243 A * 3/1994 Heckman et al. .............. 399/3
5,432,506 A * 7/1995 Chapman ...................... 705/44
5,478,992 A * 12/1995 Hamada et al. ............. 235/379
5,548,691 A * 8/1996 Sato et al. ................. 358/1.14
5,550,932 A * 8/1996 Blaylock et al. ............ 382/139
5,570,960 A * 11/1996 Smith .......................... 400/74

(Continued)

FOREIGN PATENT DOCUMENTS

EP 0 639 456 A 2/1995

OTHER PUBLICATIONS

Microsoft Press Computer Dictionary, Third Edition, 1997, p. 348.*

*Primary Examiner*—Andrew H. Hirshfeld
*Assistant Examiner*—Wasseem H. Hamdan
(74) *Attorney, Agent, or Firm*—Ladas & Parry LLP

(57) ABSTRACT

For manufacturing security documents, a plurality of security documents are printed on a sheet. The sheets are being processed in batches (15*a*, 15*b*). Each sheet carries a unique, machine readable identifier. During manufacturing, the batches are processed by several printing stations (10). At each printing station, the identifiers are read by a local computer (13) attributed to the printing station. The results are transferred upon request in data packets to a central data base (16). Each data packet contains the information for several sheets, which obviates the need to transfer the corresponding data in real time over the network. To increase security and decrease network dependence, each local computer is equipped with apparatus to check the processing status of a batch autonomously.

14 Claims, 2 Drawing Sheets

U.S. PATENT DOCUMENTS

| | | | | | |
|---|---|---|---|---|---|
| 5,625,758 | A | * | 4/1997 | Schneider et al. | 358/1.15 |
| 5,673,320 | A | * | 9/1997 | Ray et al. | 713/176 |
| 5,706,434 | A | * | 1/1998 | Kremen et al. | 709/218 |
| 5,745,899 | A | * | 4/1998 | Burrows | 707/102 |
| 5,778,178 | A | * | 7/1998 | Arunachalam | 709/203 |
| 5,778,367 | A | * | 7/1998 | Wesinger et al. | 707/10 |
| 5,787,416 | A | * | 7/1998 | Tabb et al. | 707/2 |
| 5,805,702 | A | * | 9/1998 | Curry et al. | 705/66 |
| 5,812,991 | A | * | 9/1998 | Kara | 705/410 |
| 5,845,304 | A | * | 12/1998 | Iijima | 715/530 |
| 5,873,659 | A | * | 2/1999 | Edwards et al. | 400/61 |
| 5,875,441 | A | * | 2/1999 | Nakatsuyama | 707/1 |
| 5,915,089 | A | * | 6/1999 | Stevens et al. | 709/202 |
| 5,917,996 | A | * | 6/1999 | Thorpe | 358/1.14 |
| 5,974,416 | A | * | 10/1999 | Anand et al. | 707/10 |
| 5,990,915 | A | * | 11/1999 | Tenenbaum et al. | 346/82 |
| 6,003,763 | A | * | 12/1999 | Gallagher et al. | 235/379 |
| 6,049,637 | A | * | 4/2000 | Kosarew et al. | 382/321 |
| 6,105,013 | A | * | 8/2000 | Curry et al. | 705/65 |
| 6,155,605 | A | * | 12/2000 | Bratchley et al. | 283/72 |
| 6,234,537 | B1 | * | 5/2001 | Gutmann et al. | 283/86 |
| 6,260,044 | B1 | * | 7/2001 | Nagral et al. | 707/102 |
| 6,301,013 | B1 | * | 10/2001 | Momose et al. | 358/1.15 |
| 6,424,954 | B1 | * | 7/2002 | Leon | 705/401 |
| 6,468,661 | B2 | * | 10/2002 | Benoit et al. | 428/424.2 |
| 6,484,175 | B1 | * | 11/2002 | Stewart | 707/10 |
| 6,505,179 | B1 | * | 1/2003 | Kara | 705/50 |
| 6,539,370 | B1 | * | 3/2003 | Chang et al. | 707/2 |
| 6,611,598 | B1 | * | 8/2003 | Hayosh | 380/54 |
| 6,615,219 | B1 | * | 9/2003 | Bruso et al. | 707/102 |
| 6,621,589 | B1 | * | 9/2003 | Al-Kazily et al. | 358/1.15 |
| 6,691,166 | B1 | * | 2/2004 | Gasior et al. | 709/232 |
| 6,697,512 | B2 | * | 2/2004 | Simonoff | 382/139 |
| 6,704,119 | B1 | * | 3/2004 | Suzuki et al. | 358/1.16 |
| 6,772,156 | B1 | * | 8/2004 | Rogers et al. | 707/9 |
| 6,774,921 | B1 | * | 8/2004 | Tadman et al. | 715/764 |
| 6,802,042 | B2 | * | 10/2004 | Rangan et al. | 715/501.1 |
| 6,834,290 | B1 | * | 12/2004 | Pugh et al. | 707/205 |
| 2002/0067502 | A1 | * | 6/2002 | Hansen | 358/1.15 |
| 2002/0111968 | A1 | * | 8/2002 | Ching | 707/514 |
| 2002/0122568 | A1 | * | 9/2002 | Zhao | 382/100 |
| 2003/0210804 | A1 | * | 11/2003 | Rhoads | 382/100 |

* cited by examiner

METHOD FOR PRINTING SECURITY DOCUMENTS USING SHEETS WITH IDENTIFIERS

TECHNICAL FIELD

The present invention relates a method for printing security documents.

BACKGROUND ART

When printing security documents, in particular banknotes, care must be taken to monitor the production carefully. An unaccounted loss of documents during the printing process has to be avoided.

It has been known to monitor the sheets that the security documents are printed on. For this purpose, The sheets are provided with machine readable identifiers, which are checked by the various printing stations of a security printing plant. This allows to detect a loss of a sheet and to find the location where it was lost. This solution requires, however, a substantial amount of hardware, and in particular a powerful, dedicated network for exchanging the substantial amount data that is generated in a large printing plant with high speed printers.

SUMMARY OF THE INVENTION

The problem to be solved by the present invention is to provide a system of this type that allows to monitor printing in a large plant while keeping hardware, software and network requirements low.

This problem is solved by the method of claim 1 by attributing a local computer to each printing station (or at least to each printing station having a reader for the identifiers of the sheets). The local computer reads the identifiers of the sheets processed by the printing station. The identifiers are collected and a plurality of them are commonly transmitted at a time in a single data packet to a central database. This procedure reduces the amount of network traffic considerably.

Preferably, the local computer attributed to a given printing station should check locally if all sheets of a batch have been processed. This further reduces network traffic as compared to a solution where this type of monitoring is carried out by a central database. Furthermore, it allows an operator to check, without network access, the status of a batch at the printing station. He can e.g. use the local computer for printing a protocol that describes the result of the processing of a batch, e.g. by identifying the batch and listing any failures and inconsistencies during processing.

In order to allow a local computer to check processing of a given batch, it needs to know the identifiers of the sheets belonging to the batch. For this purpose, the identifiers can be structured in such a way that they reveal directly what batch a sheet belongs to. For improved flexibility, though, a message listing the identifiers of the sheets of a batch is transmitted from the central database to the local computer before the batch is processed.

The method according to the invention is especially suited for the printing of banknotes.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

As mentioned above, the present invention is especially suited for printing banknotes and the following example will therefore discuss a banknote printing process. It must be noted, though, that the invention can be used for printing other type of security documents where a plurality of documents is printed onto sheets and the flow of the sheets is to be monitored.

Figure 1:
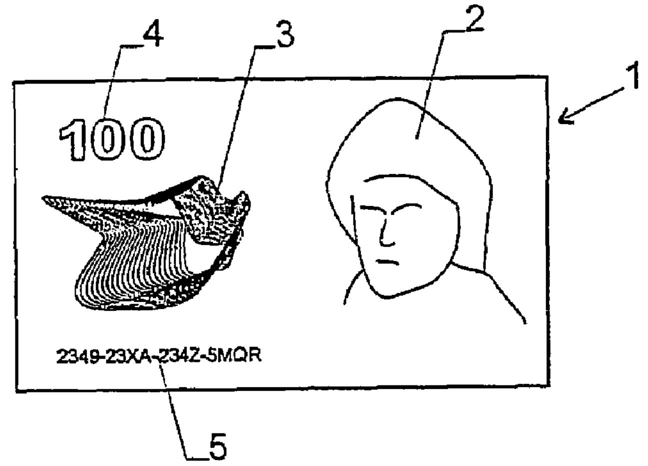
FIG. 1 a banknote.

FIG. 1 shows a simple banknote 1 with graphical illustrations 2, security features 3 and readable information 4 printed thereon. Printing, in this context, is to be understood in a broad sense and refers to any procedures used for applying visible or invisible features to a support sheet, e.g. by applying an ink, by lamination or by mechanical treatment.

Banknote 1 further carries a serial number 5, which is an individual number or string of characters unique to each banknote.

Figure 2:
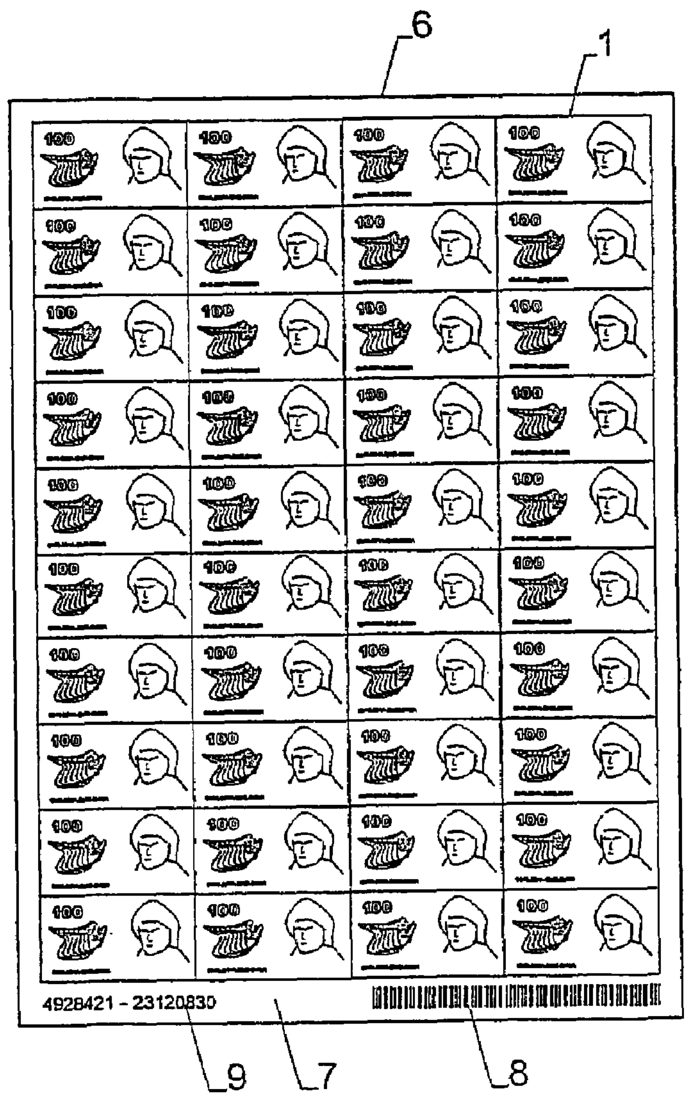
FIG. 2 a sheet with banknotes printed thereon.

During manufacturing, a plurality of the banknotes 1 are printed on a single sheet 6, such as it is depicted in FIG. 2. Once printing is substantially complete, the sheets 6 are cut for isolating the individual banknotes 1.

Sheet 6 has a margin 7, which is generally not used for printing banknotes thereon. In the present embodiment of the invention, this margin carries a machine readable identifier 8, e.g. in the,form of a bar code, as well as a human readable equivalent 9 thereof. The purpose of identifier 8 is described below.

During manufacturing, the sheets 6 are usually processed in batches. A batch is a plurality of sheets 6, which are usually processed together, e.g. in a single shift. A batch may typically comprise between thousand and several ten thousand sheets.

A sophisticated security document, such as a banknote, carries a plurality of security features that make the document difficult to copy or falsify. The production of these security features generally requires a plurality of steps to be carried out at different printing stations in a printing plant. The term printing station again is to be understood in a broad sense as any machine or location where a step required for manufacturing the document is carried out.

Figure 3:
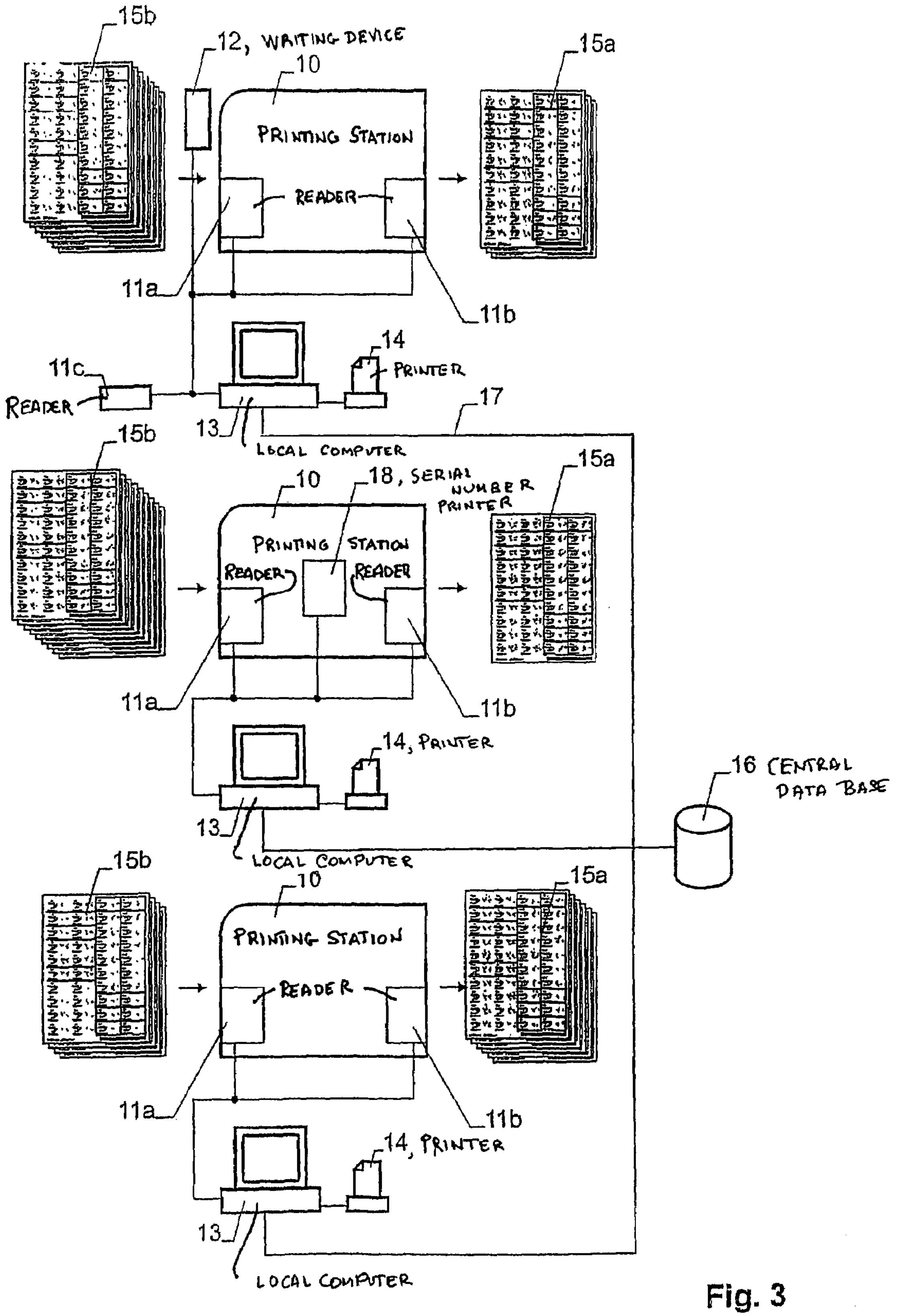
FIG. 3 a printing plant for carrying out a preferred embodiment of the invention.

FIG. 3 shows a printing plant for printing security documents. The plant comprises a plurality of printing stations 10, e.g. for applying different types of print. Usually, most of the printing stations carry out different types of printing steps, but some of them may be identical for processing batches in parallel manner, especially when a printing step takes too much time to keep up with the desired rate of production.

Each, or at least most of, the printing stations 10 comprises one or two readers **11*a*, 11*b* for reading the identifier 8 on the sheets of the processed documents. Preferably, two readers are provided, a first reader 11*a* being arranged at an input side of the printing station and a second reader 11*b*** being arranged at an output of thereof.

Furthermore, a writing device 12 is provided for writing the machine and human readable identifiers 8, 9 onto the sheets. Preferably, writing device 12 is arranged at the input side of one or more of the printing stations that are used early in the manufacturing process.

A local computer 13 is attributed to each printing station. Preferably, there is one local computer for each printing station, each equipped with a local printer 14 for printing manufacturing protocols. The local computers 13 are connected via a network 17 to a central database 16.

As described above, the sheets 6 are processed in batches. In the illustration of FIG. 3, each printing station 10 is shown while processing a batch, e.g. topmost printing station processing having processed a first part 15*a* of a batch, while a second part 15*b* of the batch has not yet been processed. Once a batch 15 has been processed completely by a printing station, it is transferred to the next printing station or to an intermediate storage location.

Database 16 contains "batch records" for all batches currently being processed or waiting for further processing in the printing plant. Each batch record contains e.g. the following data (a) a record number identifying the batch (b) the sheets belonging to the batch, in particular their identifiers (c) status of the batch (e.g. the processing steps that have been carried out so far)

(d) total number of sheets (e) number of successfully processed sheets (f) type of document, order number Entry (b) can either be explicit (e.g. a list of identifiers) or implicit (e.g. by giving the lowest identifier and the number of identifiers, assuming the identifiers to be consecutive).

Furthermore, database 16 contains "sheet records" for all sheets, each sheet record e.g. containing (a) the identifier of the sheet (b) the batch the sheet belongs to (c) reader data (an array identifying the readers the sheet has passed and the times it passed them)

(d) status (processing so far successful, failure)

(e) serial numbers 5 of the documents on the sheet

Database 16 can comprise and maintain further data, such as information on the status of and the batches attributed to a given order.

Before a batch is being processed by a printing station 10, database 16 transfers a message listing the identifiers of the sheets of the batch to the local computer 13 of the printing station. The message can e.g. comprise the sheet records for each sheet in the batch or a subset of the sheet records, e.g. comprising entries (a) and (d) thereof.

While the batch is being processed by a printing station, the local computer 13 attributed to the printing station monitors the sheets passing the readers 11*a*, 11*b*. For each sheet, local computer 13 records the time it has passed each reader. If a sheet is damaged or processed in unsatisfactory manner, it is marked as failure. A dedicated reader 11*c*, which may e.g. be a portable reader operated by an operator of the printing station, can be provided for reading the identifiers of failed sheets. When a sheet is marked as failure, the reason of failure is recorded for later storage in the status entry of the sheet record.

The operation of readers 11*a* and 11*b* and the transfer of their data to computer 13 occurs real-time, i.e. the readers and the computer must be able to process each sheet as it passes. The data retrieved in this way, is stored in a local file on computer 13.

When a batch is complete, the operator of the printing station alerts the corresponding local computer 13 manually. Now, local computer 13 checks if all the sheets in the record have passed the input side reader 11*a*, thereby detecting any unprocessed sheets. It further checks if all the sheets have either passed the output reader 11*b* or were marked as failures, thereby detecting any sheets left within printing station 10, e.g. as a consequence of a malfunction. Local computer 13 then prints a status report on its local printer 14. This report can be checked and signed by the operator of the printing station.

Local computer 13 can therefore monitor the processing of a batch and generate a status report without further help from database 16. In normal operation, however, database 16 continuously updates the information stored in its records. For this purpose, it queries each local computer 13 for recent readings at the corresponding printing station, e.g. in time intervals of 10 minutes. Upon receipt of such a query, the local computer 13 returns a data packet with a list of the readings by at least one of the readers 11*a*, 11*b* or 11*c*. This list contains, for each reading (a) the sheet identifier (b) a reader identifier (c) a time stamp of the reading in hours, minutes, seconds and fractions of seconds (d) an error code (indicating if the reading indicates a failure).

In general, each data packet contains several readings for different sheets. The data packet can further comprise the status of the current batch, i.e. it specifies how much of the batch has been processed and, after completion of the batch, a summary of the processing step.

The information in the data packet is then used by database 16 to update the data in the sheet and batch records.

As mentioned above, at least one of the printing stations 10 is provided with a writing device 12 for generating the machine and human readable identifiers 8, 9. This is preferably a printing station standing at the very beginning of the processing of the sheets 6 so that the identifiers can be applied to the empty sheets, allowing to track the sheets over the whole production process. Before the sheets of a batch 6 are passed through the writing device 12, database 16 generates the identifiers for the sheets of this batch and passes them to the local computer 13 attached to the writing device. Hence, the identifiers 8, 9 are generated under control of database 16. This allows database 16 to automatically control batch size and numbering according to the requirements of a given order.

Usually, the serial numbers 5 of the banknotes will be printed by one of the printing stations, which, for this purpose, is equipped with a serial number printer 18. The serial number printer 18 is connected to the corresponding local computer 13, which allows to generate a list of the serial numbers of all banknotes on a given sheet. For this purpose, database 16 can either send local computer 13 the serial numbers attributed to a batch before the batch is being processed at printing station 10. Alternatively, if the serial numbers are generated elsewhere, computer 13 can read the printed serial numbers from serial number printer 18 and store them, for each sheet, in its local file for later transmission to database 16 during transmission of the data packet. By maintaining a list of the serial numbers on each sheet in database 16, security can be increased further and tracking the banknotes of a given sheet or batch becomes easier.

While there are shown and described presently preferred embodiments of the invention, it is to be distinctly understood that the invention is not limited thereto but may be otherwise variously embodied and practiced within the scope of the following claims.

What is claimed is:

1. A method for printing security documents, wherein the security documents are printed onto sheets, each sheet holding a plurality of security documents and a machine readable sheet identifier, said method comprising feeding the sheets through a plurality of printing stations and electronically reading the identifiers of the sheets in at least some of the printing stations, providing a plurality of local computers, one local computer being attributed to each printing station, connecting the local computers to a central database, reading the identifiers of the sheets processed at each printing station by the computer attributed to the printing station and electronically transferring as a packet the identifiers of a plurality of sheets processed by the printing station to the central database.

2. The method of claim 1, wherein the sheets are processed in batches, each batch holding a plurality of sheets.

3. The method of claim 2, wherein the local computer attributed to a given printing station checks if all sheets of a given batch have been processed.

4. The method of claim 3, wherein at the end of the given batch the local computer prints a protocol describing a result of the processing of the batch by the given printing station.

5. The method of claim 2, wherein, before a batch is processed by a given printing station, a message listing the identifiers of the sheets of the batch is transmitted from the central database to the local computer attributed to the printing station.

6. The method of claim 1, wherein the identifiers are printed onto the sheets in at least one printing station, wherein, for each batch, the central database generates the identifiers of the sheets in said batch, and transfers them to the local computer attributed to the printing station printing the identifiers, and wherein the local computer controls the printing of the generated identifiers onto the sheets of the batch.

7. The method of claim 1, wherein the central database queries the local computers for receiving the packets with the identifiers of the processed sheets.

8. The method of claim 1, wherein, for each sheet, the time its identifier has been read at a given printing station is recorded and stored by the local computer attributed to the given printing station.

9. The method of claim 1, wherein the documents are provided with individual numbers and wherein, for each sheet, the numbers of the documents on said sheet are stored in the database.

10. The method of claim 1, wherein the documents are banknotes.

11. A method for printing security documents onto sheets, wherein each sheet holds a plurality of security documents and a machine readable sheet identifier, comprising the steps of feeding the sheets through a plurality of printing stations, wherein a local computer is attributed to each of at least some of the printing stations and wherein the local computers are connected to a central database, reading the identifiers electronically in at least some of the printing stations by means of the computer attributed to the printing station, and electronically transferring the identifiers of a plurality of sheets processed by the printing station as a packet to the central database.

12. The method of claim 11, wherein the sheets are processed in batches, each batch holding a plurality of sheets, said method further comprising the step of checking, by means of the local computer attributed to a given printing station, if all sheets of a given batch have been processed.

13. The method of claim 11, wherein the sheets are processed in batches, each batch holding a plurality of sheets, said method further comprising the step of printing, after processing a batch at a printing station, a protocol by means of the local computer attributed to the printing station, said protocol describing a result of the processing of the batch by the printing station.

14. The method of claim 11, wherein the sheets are processed in batches, each batch holding a plurality of sheets, said method further comprising the step of transmitting, before a batch is processed by a given printing station, a message listing the identifiers of the sheets of the batch from the central database to the local computer attributed to the given printing station.

* * * * *